United States Patent [19]

Gross

[11] 4,380,365
[45] Apr. 19, 1983

[54] OPTICAL FIBER, HAVING ON AT LEAST ONE OF ITS FRONTAL EXTREMITIES A PLANO-CONVEX MICROLENS JOINED WITH ITS PLANE FACE TO SAID FRONTAL EXTREMITY

[75] Inventor: Daniel Gross, Carouge, Switzerland

[73] Assignee: Battelle Memorial Institute, Carouge, Switzerland

[21] Appl. No.: 193,529

[22] PCT Filed: May 23, 1979

[86] PCT No.: PCT/CH79/00074

§ 371 Date: Jan. 23, 1980

§ 102(e) Date: Jan. 17, 1980

[87] PCT Pub. No.: WO79/01106

PCT Pub. Date: Dec. 13, 1979

[30] Foreign Application Priority Data

May 23, 1978 [CH] Switzerland .................... 5574/78

[51] Int. Cl.³ ............................................. G02B 5/172
[52] U.S. Cl. ......................... 350/96.18; 219/121 LE; 350/96.20
[58] Field of Search ............... 350/96.15, 96.17, 96.18, 350/96.20; 219/121 LE, 121 LF, 121 LP, 121 LR

[56] References Cited

U.S. PATENT DOCUMENTS 3,932,184  1/1976  Cohen et al. ............... 350/96.18 X
4,067,937  1/1978  Unno et al. ................. 350/96.18 X
4,118,270  10/1978 Pan et al. .................... 350/96.18 X
4,137,060  1/1979  Timmermann ............. 350/96.18 X

FOREIGN PATENT DOCUMENTS 2546861  4/1977  Fed. Rep. of Germany .
2625097  12/1977 Fed. Rep. of Germany .

OTHER PUBLICATIONS

Wittmann, "Contact-Bonded Epoxy-Resin Lenses to Fibre Endfaces", Electr. Lett., vol. 11, No. 20, Oct. 1975, pp. 477-478.
Benson et al., "Coupling Efficiency Between GaAlAs Laser and Low Loss Optical Fibers," Appl. Optics, vol. 14, No. 12, Dec. 1975, pp. 2815-2816.
Kato, "Light Coupling From A Stripe-Geometry GaAs Diode Laser Into . . . ," J. Appl. Physics, vol. 44, No. 6, Jun. 1973, pp. 2756-2758.
Paek et al., "Formation of a Spherical Lens at Optical Fiber Ends . . . ," Appl. Optics, vol. 14, No. 2, Feb. 1975, pp. 294-298.
Kawasaki et al., "Bulb-Ended Fibre Coupling to LED Sources," Optical and Quantum Elect., vol. 7, No. 4, Jul. 1975, pp. 281-288.
Abram et al., "The Coupling of Light-Emitting Diodes to Optical Fibers Using . . . ," J. Appl. Physics, vol. 46, No. 8, Aug. 1975, pp. 3468-3474.

Primary Examiner—John D. Lee
Attorney, Agent, or Firm—Karl F. Ross

[57] ABSTRACT

An optical fiber has an end face adjoining the flat side of a plano-convex microlens of spherical curvature made from thermoplastic material. The microlens, overlying at least the entire cross-sectional area of the fiber core at that end face, is produced by juxtaposing a substantially spherical microball with that end face, heating the microball—preferably by a pulsed laser beam—to a temperature at which it deforms and spreads over the fiber face, and letting it cool. Also disclosed is an optimum numerical relationship between the radius of curvature of the convex surface of the microlens and the distance of its apex from a virtual point source, such as a laser, illuminating that microlens with a divergent beam.

7 Claims, 9 Drawing Figures

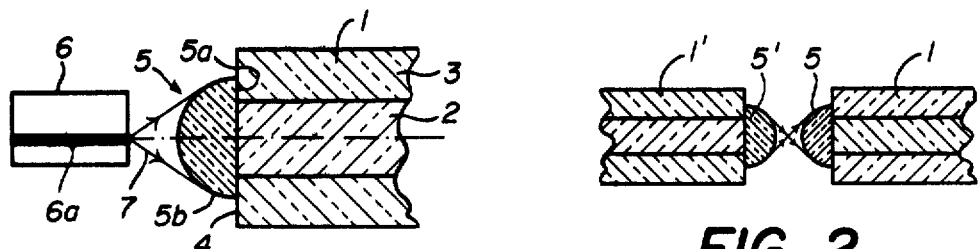
FIG. 1
FIG. 2
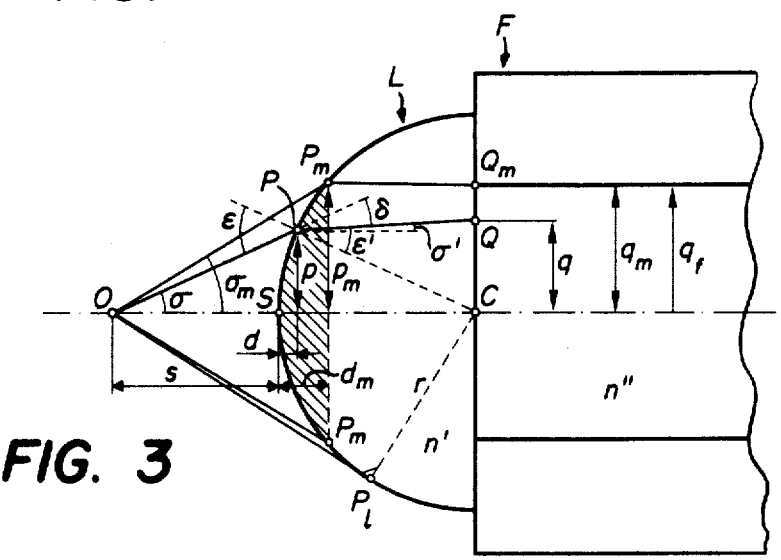
FIG. 3
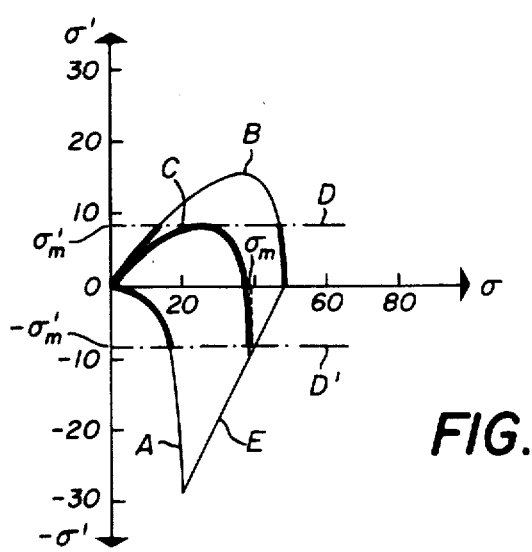
FIG. 4

OPTICAL FIBER, HAVING ON AT LEAST ONE OF ITS FRONTAL EXTREMITIES A PLANO-CONVEX MICROLENS JOINED WITH ITS PLANE FACE TO SAID FRONTAL EXTREMITY

FIELD OF THE INVENTION

My present invention relates to an optical fiber having at least one of its end faces provided with a plano-convex microlens joined thereto with its flat side, as well as to a process for manufacturing such an optical fiber.

BACKGROUND OF THE INVENTION

The use of optical fibers as light-conducting means, long regarded as having a great future in numerous applications (telecommunications, links between computers, etc.), is currently experiencing a considerable expansion, notably by reason of the appearance on the market of low-loss fibers.

However, there still exist at present a certain number of problems which militate against the general use of optical fibers, a major one of which relates to the injection of light into the core of these fibers. It is in fact well known that optical fibers with planar end faces have a relatively narrow light-acceptor angle, so that in general these fibers can collect only a small fraction of the light beam to be injected, especially in the case of the beam emitted by strongly divergent light sources such as laser diodes since the core of the fiber can only accept those of the rays which arrive at an angle smaller than or equal to its acceptor angle. In other words, this inherent limitation of the optical fibers having planar end faces leads to the major drawback of relatively low efficiency of source-fiber couplings.

A number of solutions have already been proposed in attempting to improve this coupling efficiency; they are essentially based on the interposition of optical adaptor elements between the source and the fiber. Some of the solutions thus proposed consist in using independent optical elements located at a distance from the fiber and/or from the source (for example the use of a pair of orthogonal cylindrical macrolenses, or the use of a transverse fiber as a cylindrical microlens). However, the use of independent optical elements is fraught with the serious drawback that, by increasing the number of the elements forming the coupling system as a whole, it magnifies greatly the mounting and assembly problems of this coupling system and in particular the problems of high-precision positioning and alignment of the different elements relative to one another. This is the reason why, at present, the trend is towards the concept of optical elements integrated at the extremity of the fiber, so as to minimize assembly problems. The design of such integrated elements in turn raises a certain number of other problems concerning their manufacture and/or their integration with the fiber as well as the matter of their optical performance.

To realize such integrated elements, it has for example been proposed to join microlenses of semicylindrical shape to the extremities of the fibers. However, such a solution gives rise to serious problems in the manufacture of these semicylindrical microlenses as well as in the attachment of these microlenses to the fibers. In an attempt to remedy these drawbacks, it has accordingly been proposed to produce these microlenses directly on the extremities of the fibers, by using fusion methods. The microlenses thus produced on the fiber extremities, although easy to manufacture, yield only a rather mediocre optical performance, by reason of the slight curvatures obtainable in this manner whose control is moreover greatly limited by the differences in the melting temperature of core and cladding of the fiber. To avoid the above-mentioned problem, it has then been proposed to remove the cladding of the fiber by chemical attack before proceeding with the production of the microlens on the extremity of the core thus laid free. However, this solution is far from satisfactory inasmuch as the eventual increase in coupling resulting therefrom risks to be canceled out completely by the increase in optical losses inherent in the removal of the cladding.

Furthermore, it has been proposed to produce directly on the extremities of monomodal fibers cylindrical or hemispherical microlenses of ultra-small dimensions (radius below 5 microns), made of a photoresist material, by forming these microlenses by means of microlithographic methods. However, microlenses of this kind can only slightly increase the coupling efficiency, in view of their ultra-small dimensions which approximate to a dangerous extent the wavelengths of the light rays to be collimated (the ultra-small dimensions being capable of bringing about diffraction phenomena which may annul completely the desired collimation effect). Moreover, the formation of such microlenses could not be extended to multimodal fibers, since the methods which make this manufacture possible (injection of UV rays at one of the extremities of the fiber to bring about the polymerization of the photoresist covering the other extremity) remain exclusively limited to monomodal fibers. In addition, the photoresist material constituting these microlenses will probably give rise to problems of long-term chemical stability, which in turn would imply a strong restriction of the service life of the coupling systems equipped with such microlenses. Finally, it is very doubtful whether the manufacturing methods employed for producing such microlenses would make it possible to obtain lens surfaces which would be perfectly satisfactory from the optical point of view.

OBJECT OF THE INVENTION

The object of my present invention is to remedy at least in part the above-mentioned drawbacks by providing a process for producing a coupling structure for optical fibers which makes it possible to realize the best possible compromise between optical performance and ease of manufacture and/or assembly of this structure.

SUMMARY OF THE INVENTION

An optical fiber to be produced by my present process has at least one of its end faces joined to the flat side of a plano-convex microlens designed to allow an enlargement of the acceptor cone of the light which is in to be injected into this fiber. The optical fiber is of the multimodal type, having a core with a diameter upwards of approximately ten microns, and has a spherically curved outer surface centered on the axis of the fiber. It is made of a thermoplastic material which is transparent to the luminous radiation to be carried by the fiber, its flat side joined to the fiber end having an area at least equal to the cross-sectional area of the fiber core so as to overlie same.

In the present specification, the term "transparent thermoplastic material" characterizing the material constituting the microlens located at the extremity of the fiber is intended to designate all types of materials which are transparent to luminous radiations to be carried in the fiber (irrespective of whether this radiation falls into the visible portion and/or into the infrared or ultraviolet part of the spectrum) and which have the property of softening under heat and to harden while cooling. This term is thus intended to encompass both transparent organic substances such as certain plastic materials and transparent inorganic materials such as various types of glass.

Similarly, in the present specification the generic term "optical fiber" is intended to encompass all types of optical fibers which allow the confinement of luminous energy in the core of the fiber, and in particular fibers of both the so-called "discontinuous index" type and the so-called "variable index profile" type. The more specific term "multimodal optical fiber" is in turn intended to designate the above-defined class of fibers whose core diameter is relatively large (typically at least equaling about 10 microns) compared with the wavelength of the luminous radiation carried by the fiber (in contradistinction to the "monomodal" fibers whose core diameter is of the order of magnitude of the wavelength, namely in general only a few microns).

It is thus seen that the purpose of my improved fiber/lens structure is essentially the enlargement of the acceptor cone of the light which is to be injected into this multimodal fiber. Such a structure can be used in particular to realize the injection into the fiber of light emitted by strongly divergent virtual point sources, such as laser diodes for example, the part-spherical lens included in this structure making it in fact possible to transform the strongly divergent beam emitted by such sources into a sufficiently collimated beam to be accepted, at least in a major proportion, by the core of the fiber.

The above-defined structure is also suitable to realize the focusing of the luminous radiation carried by the fiber (by reason of the well-known principle of inverted return of light), so that it could also be utilized (in addition to the aforementioned general application relative to coupling between divergent source and fiber) in a certain number of other more specific applications: coupling between two fibers; focusing of the energy carried by a fiber for various uses such as displays, or treatment of various materials.

The part-spherical lens of the structure according to the invention may assume a great diversity of configurations: spherical segment of a thickness substantially smaller than its radius of curvature, a substantially hemispherical lens, or again a spherical segment having a thickness greater than its radius of curvature (configurations which are equivalent from the optical point of view if they all have the same radius of curvature, provided that their thickness remains greater than the "optionally useful" thickness). The minimum condition imposed for the part-spherical lens is, however, that its flat side adjoining an end face of the fiber should cover completely the cross-section of at least the fiber core.

The other properties of the lens (refractive index, radius of curvature, lens-source distance) cannot, however, be set arbitrarily if it is desired to obtain an optimum coupling efficiency; on the contrary, they must be determined in a rigorous manner in dependence upon the parameters of the fiber with which the lens is to be associated. The choice of the refractive index of the lens is not in itself absolutely critical with regard to the realization of an optimum coupling efficiency. However, I prefer to choose this refractive index approximately as a function of the parameters of the fiber (and of the source), making it substantially equal to that of the fiber core (such index varying between 1.45 and 1.50 for the conventional fibers) in the case of a fiber of low numerical aperture associated with a slightly divergent source, and making this index appreciably greater than that of the fiber core (e.g. equal to approximately 2) in the case of a fiber having a large numerical aperture associated with an almost punctiform but strongly divergent source. Once the refractive index has been determined, the respective values of the radius of curvature of the lens and of the source-lens distance must, on the other hand, be determined in a quite rigorous manner in dependence upon the fiber parameters if an optimum coupling efficiency is to be obtained, these values being moreover capable of differing widely from one fiber to another. The mode of determining these values, which is relatively complex, will be outlined later.

It is thus seen that the achievement of an optimum coupling efficiency demands the realization of a part-spherical lens whose characteristics must be rigorously adapted to the parameters of the optical fiber on which this lens is to be formed. This calls for a particularly flexible manufacturing method which makes it possible to form at will microlenses of that shape having any desired predetermined features.

According to my present invention, such a manufacturing process starts with an optical fiber having a planar end face orthogonal to its axis and comprises the steps of:

- disposing at the center of that end face a microball of substantially spherical shape made of a transparent thermoplastic material whose refractive index is selected so as to be identical with that of the microlens to be formed and whose initial radius depends on the dimensions of the lens to be formed,
- heating the microball to a sufficiently high temperature to bring about its progressive spreading over the fiber end, the microball assuming during its spreading the shape of a perfectly spherical segment which tends to flatten out increasingly as the heating continues,
- and stopping the heating at the instant when the spherical segment reaches the dimensions desired for the microlens in question, this segment being fixed in its definitive shape during cooling to constitute the microlens.

Thus, in the process according to my invention the microball of transparent thermoplastic material, initially juxtaposed with a planar fiber face, is subsequently subjected to a thermal treatment adapted to effect its controlled transformation into a spherical segment having the required features as determined by the free choice of the parameters of the initial microball.

The parameters referred to are selected so that this microball has, on the one hand, a refractive index identical with that which is desired for the microlens to be formed and, on the other hand, an initial radius which is a function of the desired dimensions of the microlens. Thus, in the case where it is desired to form a part-spherical microlens with a radius of curvature r and a thickness h, there will be selected a microball having an initial radius $r_0$ such that (with conversion of the volume during the entire transformation of the microball):

$$r_o = \sqrt[3]{\tfrac{1}{4} h^2 (3r - h)}$$

In the particular case where it is desired to form a hemispherical microlens of radius r, there will accordingly be selected a microball having an initial radius $r_o$ equal to 0.79 r.

In order to carry out the thermal treatment designed to effect the controlled transformation of the initial microball into a spherical segment having the desired properties, I may use any appropriate heating means such as an electric microoven, an electric arc, a microburner or a laser beam, for example.

However, I particularly prefer to make use of a pulsed laser beam (such as that of a $CO_2$ laser), by reason of the great operating flexibility of the latter (especially with regard to spatial control, timing control or power control).

BRIEF DESCRIPTION OF THE DRAWING

The above and other features of my invention will now be described in detail with reference to the attached drawing in which:

FIG. 1 is a schematic view, in longitudinal section, illustrating an embodiment;

FIG. 2 is a longitudinal sectional view illustrating a modification;

FIG. 3 is a longitudinal sectional view, on a larger scale, illustrating the progress of different luminous rays through the structure of the invention;

FIG. 4 is an explanatory diagram relating to FIG. 3;

SPECIFIC DESCRIPTION

Figure 5:
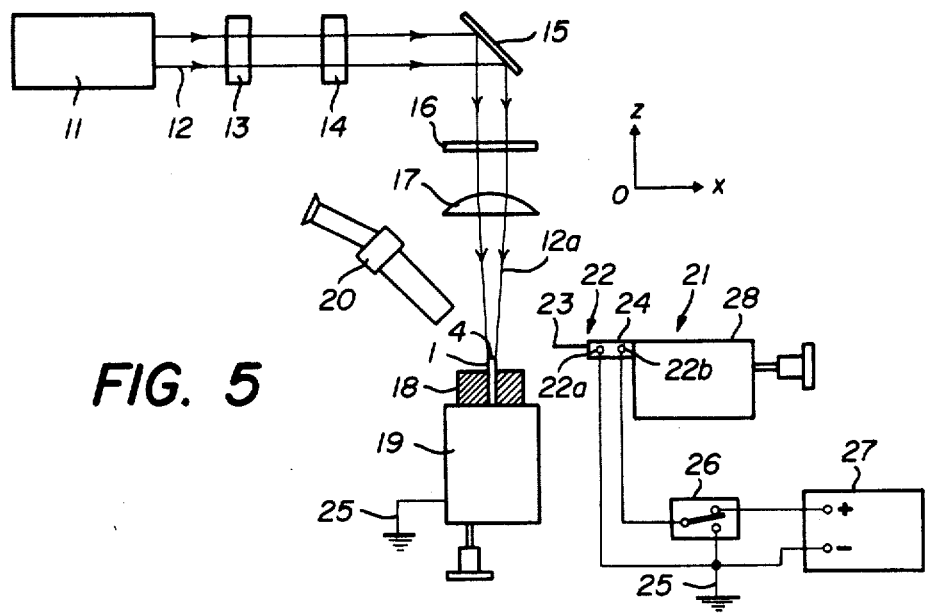
FIG. 5 is a schematical view of an installation for carrying out the process according to my present invention.

The structure shown in FIG. 1 comprises as optical fiber 1 composed of a core 2, made of a first transparent material, surrounded by a cladding 3 made of a second transparent material having a refractive index lower than that of the core material. The optical fiber 1 has a planar frontal or end face 4 orthogonal to the axis of the fiber. With the frontal face 4 is juxtaposed a plano-convex lens 5 of substantially hemispherical shape, centered on the axis of fiber 1. This hemispherical lens 5 is made of a transparent thermoplastic material whose refractive index is at least equal to that of the fiber core. Moreover, the dimensions of the lens 5 are so selected that its planar face 5a joined against the frontal face 4 of the fiber entirely covers at least the transverse section of fiber core 2. The optical fiber is of the multimodal type whose core 2 has a diameter of at least about ten microns (typically of the order of some tens of microns) so that the planar end face 5a of the lens 5 must have a diameter which is also at least equal to about ten microns.

The lens 5 thus joined to the extremity of the fiber 1 can be used both as admission element of the fiber (in which case the lens can serve notably to effect the injection into the interior of the core of the fiber of the luminous rays emitted by a source of strongly divergent light such as a laser diode) and also as output element of the fiber (in which case the lens can serve for focusing the luminous rays carried by the fiber).

FIG. 1 thus illustrates by way of example the use of the lens 5 as an admission element serving to effect the injection into the fiber 1 of the divergent beam 7 emitted by the junction 6a of a laser diode 6; it is known that the laser diodes generally emit a light beam which is at the same time strongly divergent in the plane perpendicular to the junction and weakly divergent in the plane of the junction. The diode 6 is located at a distance from the hemispherical face 5b of the lens so that its junction is centered on the common axis of the lens 5 and the fiber 1. The characteristics of the lens are selected relative to those of the fiber 1 and those of the laser diode 6 so as to make possible the conversion of the divergent beam 7 into a beam sufficiently collimated to let the major proportion of its rays be accepted by the fiber 1.

FIG. 2 illustrates by way of example the use of the structure described above to provide a connection between two optical fibers 1 and 1', the lens 5' joined to the extremity of the upstream fiber 1' serving to focus the beam carried by this fiber 1' and the lens 5 joined to the extremity of the downstream fiber 1 serving to inject into this fiber 1 the beam issuing from the fiber 1'.

As has been stated hereinabove, the exact characteristics of the lens to be attached to an optical fiber should, in order to provide an optimum coupling efficiency, be determined both in dependence upon the parameters of this optical fiber and upon the intended use; such a determination is relatively complex to carry out. In the following, I shall describe the principle of such a determination with the simplifying assumption of a punctiform divergent source whose beam is to be injected into an optical fiber of discontinuous index. FIG. 3 shows such a fiber F of discontinuous index having a core of radius $q_f$ and a refractive index n", a hemispherical lens L centered on the extremity of the fiber F having a radius of curvature r and a refractive index n', and a punctiform divergent source O located on the axis of the lens L at a distance s from the apex S of the latter. Let furthermore OP designate any incident light ray coming from point O and striking the lens at the point P, this ray then being refracted by the lens as a ray PQ. Let us then designate respectively by $\sigma$ and $\sigma'$ the respective inclinations of the rays OP and PQ relative to the optical axis of the system, by $\epsilon$ and $\epsilon'$ the respective angles of the rays OP and PQ relative to the lens radius at the point P, by $\delta$ the angle of deflection of the ray on passing the point P, by p and g the respective radial distances of the points P and Q and by d the axial distance of point P from the apex S of the lens. The theorems relating to triangles as well as the well-known law of refraction then make it possible to formulate the following equations:

$$\frac{r}{\sin \sigma} = \frac{r+s}{\sin \epsilon} \qquad (1)$$

$$\sin \epsilon = n' \sin \epsilon' \qquad (2)$$

$$\delta = \sigma - \sigma' = \epsilon - \epsilon' \qquad (3)$$

By combining the foregoing relations, I can write:

$$\sigma' = \sigma + \arcsin\left[\frac{1}{n'}\left(1 + \frac{s}{r}\right)\sin\sigma\right] - \arcsin\left[\left(1 + \frac{s}{r}\right)\sin\sigma\right] \quad (4)$$

This last equation, which expresses the variations of the inclination $\sigma'$ of the refracted ray PQ as a function of the inclination $\sigma$ of the incident ray OP, shows that the behavior of the refracted ray depends solely on the values of the index n' of the lens and of the ratio s/r (this relationship also showing that a lens is never perfect and that it does not give exactly collimated rays, that is to say rays precisely parallel to the axis, except within a narrow range of the angle of incidence $\sigma$). This relationship thus makes it possible to determine, for n' and s/r of predetermined magnitudes, the mean divergence or convergence or rays traversing the lens, and thus to fix the values of n' and of s/r which ensure the best possible collimation.

It can be shown that the optimum collimation is likely to be obtained for values of the ratio s/r close to a mean value $(s/r)_m$ given by $$(s/r)_m = \sqrt{(s/r)_p \times (s/r)_l} \text{ with} \quad (5)$$

$$(s/r)_p = \frac{1}{n'-1} \text{ and}$$

$$(s/r)_l = \frac{1}{\cos[\arcsin(1/n')] - 1}$$

where $(s/r)_p$ represents a first limiting value at which the incident paraxial rays leave the lens along a direction parallel to the axis (the rays outside the paraxial zone then produce convergent rays which, if their convergence is too extensive, could not be accepted by the fiber F), and where $(s/r)_l$ represents a second limiting value at which the outermost incident rays (that is to say the incident rays practically tangential to the lens) leave the lens along a direction parallel to the axis (the paraxial rays then giving divergent beams which, if their divergence is too extensive, could not be accepted by the fiber F either).

In other words, the geometric mean $(s/r)_m$ of limiting values $(s/r)_p$ and $(s/r)_l$ constitutes a value by which the system is dimensioned in such a manner that the incident intermediate rays leave the lens in a direction parallel to the axis, the incident limiting or paraxial rays then giving respectively convergent or divergent beams whose respective convergence or divergence is sufficiently small to let them be accepted, at least in a major proportion, by the core of fiber F. The above-stated approximative formula (5) shows, moreover, that this mean value $(s/r)_m$ depends on the value of the refractive index n' selected for the lens L. As previously mentioned, this value n' is advantageously selected as a function of the parameters of fiber F and of the divergent source O, so as to be substantially equal to that to the core of the fiber (the index varying between 1.45 and 1.50 for the usual fibers) in the case of a fiber of low numerical aperture associated with a slightly divergent source, and to be appreciably greater than that of the fiber core (the index may then be selected equal to 2) in the case of a fiber of large numerical aperture associated with a strongly divergent source.

The following table indicates by way of example the different numerical values likely to be assumed by the ratio s/r in the three cases mentioned above for a refractive index n' of the lens respectively equaling 1.5 and 2:

|  | $(s/r)_p$ | $(s/r)_l$ | $(s/r)_m$ |
| --- | --- | --- | --- |
| n' = 1.5 | 2.0 | 0.34 | 0.83 |
| n' = 2 | 1.0 | 0.16 | 0.39 |

The diagram of FIG. 4 (traced by way of example for a lens with refractive index equal to 1.5) illustrates in a more detailed manner the variations of the inclination $\sigma'$ of the refracted ray PQ as a function of the inclination $\sigma$ of the incident ray OP for the different values s/r mentioned above (the positive portion of the axis $\sigma'$ corresponding to the refracted rays which are divergent, and the negative part to the convergent refracted rays), the curves A, B and C corresponding respectively to the values $(s/r)_p$, $(s/r)_l$ and $(s/r)_m$. The horizontal straight lines D and D' located to either side of the axis $\sigma$ define moreover the acceptor cone of the optical fiber F (lines D and D' intersecting the ordinate axis $\sigma'$ at their respective limiting values $+\sigma'_m$ and $-\sigma'_m$ corresponding to the numerical aperture of the fiber which by way of example was selected to equal 0.2 in the drawing). These straight lines D and D' thus serve to determine for each of the curves A, B and C the only beam portions which are acceptable by the fiber F (in fact, only the refracted rays which arrive on the fiber at an angle $\sigma'$ comprised between the limiting values $+\sigma'_m$ and $-\sigma'_m$, that is to say the rays corresponding to the heavy curve portions, can be injected into the fiber). Lastly, on the diagram of FIG. 4 is shown the curve E, which constitutes the geometric location of the limiting angles corresponding to the incident rays $OP_l$ which arrive tangentially at the lens L (FIG. 3) for the different values s/r likely to be assumed by the system.

The diagram of FIG. 4 thus shows clearly that a choice of values of s/r too remote from the means value $(s/r)_m$ (corresponding to the curve C) leads to refracted beams the major proportion of which is either too convergent (cf. values s/r close to that corresponding to the curve A) or too divergent (values s/r approximating that corresponding to the curve B) to be accepted by the fiber F. It is thus seen that it is desirable to select for the ratio s/r values very close to the mean value $(s/r)_m$ if it is desired to obtain a refracted beam the major proportion of which is to be acceptable by the fiber F. In fact, the diagram of FIG. 4 shows very clearly that, for s/r selected substantially equal to $(s/r)_m$, the fiber F is capable of accepting the major proportion of the incident beam emitted by the source O, namely all that portion of the incident beam which has an aperture angle $2\sigma_m$ (where $\sigma_m$, shown in FIG. 4 to be close to 40°, is given by the abscissa of the point of intersection of the curve C with the straight line D'). In FIG. 3, this portion of the incident beam acceptable by the fiber F is constituted by the limiting rays $OP_m$ of inclination $\sigma_m$; the limiting rays $OP_m$ are converted into refracted rays $P_m Q_m$ of inclination $-\sigma_m$, slightly less than 10° according to FIG. 4, which strike the end face of fiber F at the periphery of its core.

The optimum value of the ratio s/r thus being defined as substantially equal to the mean value $(s/r)_m$, there now remains to be determined the optimum absolute value of the radius of curvature $r_m$ which is to be adopted for the lens as a function of the radius $q_f$ of the core of fiber F. The essential condition for having an optimum value of $r_m$ is that all the rays acceptable by the fiber fill completely the core of this fiber (so as to exploit to the greatest possible extent the capacity of this fiber), which is given by:

$$q_m \simeq q_f \tag{6}$$

where $q_m$ designates the radial distance of the point of incidence $Q_m$ of the refracted ray $P_m Q_m$ on the fiber F from the fiber axis, i.e. the core radius.

By assuming in first approximation that:

$$q_m \simeq p_m, \text{ and} \tag{7}$$

$$p_m \simeq (s_m + d_m) \tan \sigma_m \simeq s_m \tan \sigma_m \tag{8}$$

($\sigma_m$ being given by the diagram of FIG. 4), it is thus possible to determine the absolute value of the optimum distance $s_m$, and thus to deduce therefrom the value of the optimum radius of curvature $r_m$ of the lens.

It is thus seen that the achievement of an optimum coupling efficiency for a given fiber F depends, in the final analysis, only on the suitable choice of the refractive index n' and of the radius of curvature r of the lens L. In this respect it is of little importance whether this lens L has a substantially hemispherical shape or otherwise the shape of a spherical segment having a thickness smaller or greater than its radius of curvature, the minimal condition being that this segment should have a thickness which at least equals the useful thickness $d_m$ (the value of $d_m$ being defined by the axial distance of the chord $p_m$ from the apex S of the lens). It can thus be easily conceived to replace the hemispherical lens L in FIG. 3 with a part-spherical lens having dimensions identical with the useful portion of the lens L indicated by hatching in the drawing, or with any other part-spherical lens having intermediate dimensions (any thickness h greater than the useful thickness $d_m$) between those of this useful portion and those of the hemispherical lens, all these lenses of different dimensions (but with identical index n' and radius of curvature r) being in fact practically equivalent from the optical point of view.

The determination of the precise features of the microlens designed to be joined to a fiber proves to be more complex in the case where the fiber has an index gradient instead of a discontinuous index, and/or in the case where the divergent source is a non-punctiform source instead of a punctiform source. However, the results of such an analysis remain quite equivalent to those mentioned above from the qualitative point of view, as can be easily demonstrated.

To sum up, it is seen that the characteristics of the microlens designed to be joined to a given fiber cannot be selected arbitrarily if it is desired to obtain an optimum coupling efficiency for this fiber. On the contrary, the characteristics of this microlens must be determined in a quite rigorous and precise manner so as to ensure that, on the one hand, the divergent incident beam is transformed into a beam sufficiently collimated to be for the most part acceptable by the fiber (by choosing the optimum value of the ratio s/r) and, on the other hand, so that the totality of the rays acceptable by the fiber be enabled to fill completely the core of this fiber (by selecting the optimum value of the absolute quantities s and r). Hence the importance of the manufacturing process according to the invention, which makes it possible in fact to form any microlens with predetermined characteristics.

Figure 6:
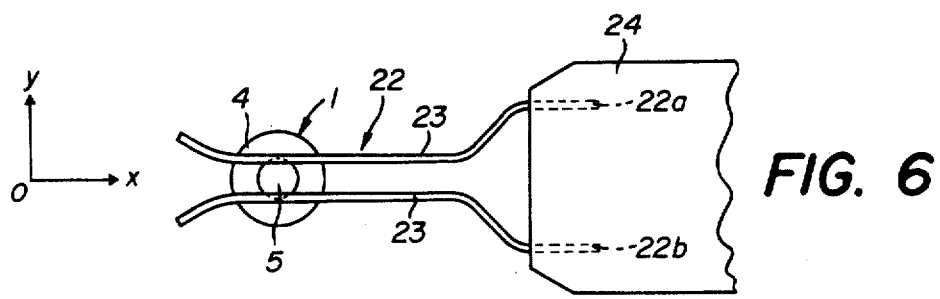
FIG. 6 is a plan view of an enlarged detail of FIG. 5.

FIGS. 5 to 7 illustrate by way of example a particular installation for carrying out the manufacturing process according to the present invention. This installation comprises (FIG. 5) a radiation source 11, constituted by a $CO_2$ laser capable of emitting a spatially coherent beam 12 of a power of about 10 watts (the diameter of the beam 12 being of the order of 5 to 10 mm). The laser beam 12, which is emitted substantially horizontally by the laser 11, is designed to be reflected downward with the aid of a mirror 15, inclined at 45°, after passing successively through an adjustable attenuator 13 and an adjustable interruptor 14. The adjustable attenuator 13 is capable of attenuating the beam emanating from the laser to a value comprised between 0 and 5% of its initial power, whereas the adjustable interruptor 14 is so designed as to allow the laser beam to pass during a time interval comprised between 0.1 and 10 seconds (the attenuator 13 and/or the interruptor 14 can be constituted by mechanical and/or opto-electronic components). The presence of the attenuator 13 and of the interruptor 14 thus makes it possible to generate any laser pulse whose power and duration can be regulated at will. The mirror 15 is constituted by an optically planar aluminum platelet which absorbs the major portion of the incident laser beam, reflecting only about 5% thereof. The portion of beam 12 thus reflected downward is then subjected, after passing through a diaphragm 16 of adjustable aperture, to focusing into a beam 12a by means of a plano-convex lens 17 made of germanium on the planar end face 4 of an optical fiber 1, disposed in proximity of the focus of this lens 17.

The optical fiber 1 is mounted vertically in a fiber holder 18 rigid with a micromanipulator 19. This micromanipulator 19 is designed to allow the displacement of the fiber 1 both in the vertical direction O-z and in the horizontal directions O-x and O-y so as to ensure the exact positioning of the face 4 of this fiber relative to the focus of the laser beam 12a (the micromanipulator 19 having a spatial resolution of the order of a few microns along the three coordinates). The fiber 1 mounted in its support 18 can be visually observed with the aid of a binocular stereo-microscope 20, disposed with an inclination of 30° relative to the vertical in order to avoid interference with the trajectory of the laser beam (advantageously, a microscope 20 making possible a magnification between 25 and 160 will be used, this microscope being further equipped with an ocular micrometer having a resolution of about 1 micron). The micromanipulator 19 and the fiber support 18 are grounded at 25, to avoid an electrostatic charging of the fiber 1.

The above-described installation furthermore comprises a device 21, which has the task of disposing a microball 5', made of a transparent thermoplastic material (FIGS. 6 and 7), at the center of the face 4 of fiber 1. This device 21 comprises an electrostatic contact 22, constituted (FIG. 6) by two platinum wires 23 spaced from each other that project laterally from an insulating plate 24 into which they are fastened by extremities thereof embedded into the plate 24 so as to constitute terminals 22a and 22b of the contact 22. These two wires 23 have parallel central portions and diverge at their extremities, the spacing of the wires in their central portion being substantially smaller than the diameter of the microball 5' to be positioned. The terminal 22a of the contact 22 is also grounded at 25 whereas the other terminal 22b is connected to the armature of a two-position reversing switch 26 having one bank contact grounded at 25 while the other bank contact is connected to the positive pole of a direct-current source 27 of the order of 150 to 300 volts, the negative pole of the source 27 being also grounded at 25. Switch 26 thus enables either the establishment of a direct-current potential difference of 150 to 300 V between the two wires 23, or the grounding of these two wires. The insulating plate 24 of contact 22 is mounted horizontally on a micromanipulator 28 serving to effect the displacement of the contact 22 in the three spatial directions (micromanipulator 28 having a spatial resolution of the order of a micron along the three coordinates), in order to position the central portion of contact 22 over the face 4 of fiber 1.

The mode of operation of the installation described in the foregoing is as follows:

First of all, an optical fiber 1 is prepared having a perfectly planar end face 4 orthogonal to the axis of the fiber. To carry out this preparation, a fiber freed from its plastic protecting sheath is treated in the following manner: The fiber is initially heated by a microflame to render it fragile and is then subjected to tension and flexure to bring about its rupture producing a roughly planar end face. This end face is then mechanically polished with the aid of an abrasive paste, containing diamond granules of about 3 microns, for a time of the order of one hour. Following this mechanical polishing, the fiber face thus polished is plunged for about 30 seconds into a vessel containing sulphuric acid at 130° C., in order to remove the thin protective plastic layer which normally surrounds the fiber, and also in order to degrease completely the polished face of this fiber. The fiber thus treated with acid is then placed in an ultrasonic cleaning cell filled with isopropyl alcohol and is finally rinsed with distilled water.

Once the fiber 1 has been prepared in the manner indicated above, it is mounted into the fiber support 18 rigid with the micromanipulator 19, and this micromanipulator is actuated so as to bring the face 4 of the fiber 1 substantially within the focal zone of laser beam 12a. This focal zone may have been located, prior to the transport of the fiber to the focus, by means of diverse methods: visual detection of the position and of the shape of the focus of the laser by observation of the micro-crater formed in a slide cover glass (with the aid of an attenuated laser beam), visual location with the aid of a thermosensitive paper, visual location by observation of the combustion figure obtained in a simple sheet of paper, etc. Once the end face 4 of fiber 1 has been disposed in the focal zone of the laser beam, the "glazing" of this face follows, in a particularly advantageous manner, by the laser fusion of face 4 prior to the production of the microlens. This glazing by laser fusion has for its object the production of an optically polished front end, namely one having a perfectly smooth and non-diffusing surface. This glazing is carried out by applying to the face 4 a laser pulse of sufficient power and duration and by displacing this face 4 in the plane xOy by means of the micromanipulator 19, so as to glaze the whole face in a homogeneous manner, the superficial fusion of this face 4 being controlled by actuation of the adjustable diaphragm 16. When the surface has become perfectly smooth (observation with the aid of the microscope 20), the glazing is stopped by shutting the diaphragm 16.

The glazing of the face 4 is followed by the disposing in the center of this face a substantially spherical microball 5' made of a transparent thermoplastic material which is to be subsequently transformed by controlled laser fusion into a microlens 5 of predetermined properties. Prior to its juxtaposition with the fiber, first the appropriate selection and cleaning of the microball 5' are carried out. In fact, this microball 5' is previously selected so as to have, as previously indicated, on the one hand a refractive index identical to that of the desired microlens 5 and, on the other hand, an initial radius $r_o$ which determines the desired final dimensions r and h of the microlens (in accordance with the previously indicated relationship). The correct selection of the microball 5' is followed by its cleaning. By way of example, this cleaning may consist in immersing successively the microball 5' into filtered trichloroethylene, analytical-grade methanol and demineralized water and drying the microball thus treated on a hot plate heated to 250° C. The electrostatic contact 22 is also cleaned in the same way as the microball 5'.

Completion of the cleansing is followed by the location proper of the microball 5'. To effect this location, first of all the micromanipulator 28 is actuated (with observation under the microscope 20) so as to bring the central portion of wires 23 of the contact 22 straight above the microball 5' at a distance of about 5 to 10 microns therefrom and the switch 26 is reversed to apply a potential of 150 to 300 V between the two previously grounded wires 23. The application of this potential generates between the two wires 23 an inhomogeneous electrical field of sufficient strength to attract the microball 5' onto these wires and to keep it there suspended (the attracting force resulting from the dielectric constant and from the density of electrostatic energy of the material making up the microball, which are greater than those of the air).

Figure 7A:
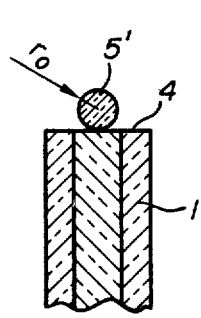
FIGS. 7a, 7b and 7c are sectional views of another detail, enlarged, of FIG. 5, this detail being shown in different stages of the process.
Figure 7B:
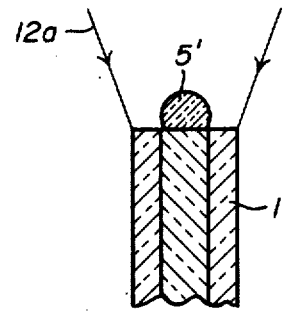

Once the microball 5' has been suspended on the contact 22, the micromanipulator 28 is actuated with observation under the microscope 20 so as to come to lie directly above the center of the end face 4 of fiber 1, the microball being at about 5 to 10 microns from that face; the switch 26 is then thrown into its other position so as to ground the two wires 23 to release the microball onto the center of the face 4 (FIG. 7a).

Figure 7C:
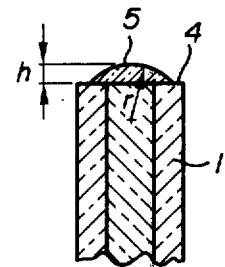

With the microball 5' thus correctly positioned at the center of face 4, and with the resulting assembly still located substantially within the focal zone of laser beam 12a, this microball 5' can now be transformed with the aid of the laser beam 12a into a microlens having the shape of a spherical segment 5 with the desired dimensions. To carry out this transformation, there is applied to the microball 5' a single laser pulse or a train of laser pulses of sufficient power and duration to bring about the deformation of the microball; each of the pulses is of sufficient power to raise the microball to a temperature enabling a shape change. The microball 5' then spreads out progressively over the frontal face 4 of fiber 1, flattening out against this face (FIG. 7b) as the pulses succeed one another, though the outer surface of the microball retains under this deformation a perfectly spherical and optically polished form at all times owing to the surface tensions prevailing there. The transformation of this microball 5' can be controlled with the aid of the diaphragm 16 so as to be effected at a speed sufficiently slow to enable the stage of transformation reached to be visually observed at any instant with the aid of microscope 20. This thermal deformation by means of laser pulses is stopped when the microball 5' has sufficiently spread and flattened out on the face 4 to assume the shape of a spherical segment having the desired radius r and height h. The assembly then cools down to be rigidified, the spherical segment thus fixed in its definitive shape constituting the desired microlens 5 (FIG. 7c).

It is thus clearly seen that the process described is particularly flexible and well adapted to the manufacture of microlenses integrated with the extremities of optical fibers by facilitating, thanks to the free choice of the refractive index and the dimensions of the initial microball, the realization of microlenses whose optical properties can be varied within a wide range. Hence the possibility of ensuring in all cases of optimization of the performances of the microlens, and this irrespectively of the type of the optical fiber on which this microlens is to be formed.

In the described process, the glazing operation applied prior to the positioning of the microball offers the major advantage, as verified experimentally, of minimizing the decentering effect likely to occur in the course of the softening of the microball by laser pulses. This glazing operation also offers the additional advantage of improving the attachment of the microlens onto the end face of the optical fiber, as well as of improving the optical performance of the assembly (by eliminating all centers of light diffusion and all air bubbles likely to be present at the fiber-microlens interface of an unglazed fiber).

Example

An optical fiber of parabolic index gradient was used, known commercially under the designation Schott type 5, having a doped silicon core with a refractive index of the order of 1.45 (peak softening temperature of the order of 1500° to 2000° C.) and a diameter of the order of 50 microns, which core was surrounded by a silicon cladding having an external diameter of the order of 136 microns. This fiber had a numerical aperture of 0.261, and hence a maximal acceptor angle in air (at the center of the core) of 15.1° (the maximum acceptor angle in a medium of 1.51 index, corresponding to that of the microlens to be formed at the fiber end, thus equaling 10°).

This fiber was subjected to the preparative operations described above (mechanical polishing followed by glazing), so as to realize an end face orthogonal to the axis of the fiber which had undergone optical polishing.

Following this preparation of the fiber, a microball made of glass (softening point of the order of 1000° C.) was selected, with a refractive index of the order of 1.51 and a diameter of the order of 46 microns, which was subsequently cleaned and positioned on the center of the optically polished end face of the fiber, in the previously described manner.

After correct positioning of the microball, it was reshaped by means of a laser beam, applying to it a train of laser pulses of sufficient power and duration, and observing its progressive deformation with the aid of the binocular microscope. The shaping with the laser beam was stopped when the microball had assumed a substantially hemispherical form (the total laser energy applied being of the order of 10 millijoules). After cooling there was obtained in this manner a microlens of substantially hemispherical form, perfectly joined to the end face of the fiber, this microlens having a radium of curvature of about 28.5 microns.

After formation in this manner of the microlens on the face of the fiber, a laser diode was placed at a distance from the microlens (on the axis of the system) which had a rectangular emitter surface of about 0.5 micron wide by 13 microns in length, which emitted a beam having a divergence of about 25°×3° (angles corresponding to the intensity 1/e), and the coupling coefficient of the assembly was measured (i.e. the ratio of the intensity of light injected into the fiber to the total intensity of light emitted by the laser diode). The emitting surface having been disposed at an optimum distance from the apex of the microlens, a coupling coefficient of 60% was determined.

I claim:

1. In combination, a virtual point source of divergent rays and an optical fiber having an extremity confronting said source for irradiation thereby, said fiber having an axis in line with said source and an end face at said extremity perpendicular to said axis adjoining a flat side of a plano-convex microlens of transparent thermoplastic material with a spherically curved outer surface, said fiber having a core whose cross-sectional area at said end face is completely overlaid by said flat side of said microlens, said microlens having an apex on said axis separated from said source by a distance s related to the radius of curvature r of said outer surface by a ratio s/r approximately corresponding to the geometric mean of a first limiting value $(s/r)_p = 1/(n'-1)$ and a second limiting value $(s/r)_l = 1/\{\cos[\arcsin(1/n')] - 1\}$, n' being the refractive index of said thermoplastic material and being at least equal to the refractive index of said core.

2. The combination defined in claim 1 wherein said core has a diameter of not less than about 10 microns.

3. The combination defined in claim 1 or 2 wherein $n' \approx 1.5$, $(s/r)_p \approx 2.0$ and $(s/r)_l \approx 0.34$, the ratio s/r being substantially equal to 0.83.

4. The combination defined in claim 1 or 2 wherein $n' \approx 2$, $(s/r)_p \approx 1.0$ and $(s/r)_l \approx 0.16$, the ratio s/r being substantially equal to 0.39.

5. A process for forming on at least one end face of an optical fiber a plano-convex microlens having the shape of a spherical segment joined with its flat side to said end face, comprising the steps of:
   (a) employing a fiber having a planar end face orthogonal to the axis of the fiber;
   (b) disposing at the center of said end face a microball of substantially spherical shape made of a transparent thermoplastic material whose refractive index is identical with that of the microlens to be formed and whose initial radius is selected in dependence on the dimensions of the lens to be formed;
   (c) heating said microball to a temperature sufficiently high to bring about its progressive spread over said end face, said microball thereby assuming in the course of its spread the shape of a perfectly spherical segment which tends to flatten out increasingly as the heating continues;
   (d) stopping the heating at the instant when said segment reaches the dimensions desired for said microlens; and
   (e) rigidifying said segment by letting it cool.

6. A process as defined in claim 5 wherein said microball is heated in step (c) by a pulsed laser beam.

7. A process as defined in claim 5 or 6, comprising the further step of smoothing and polishing said end face before disposing said microball thereon in step (b).

* * * * *